(12) United States Patent
Bauer

(10) Patent No.: US 10,431,792 B2
(45) Date of Patent: Oct. 1, 2019

(54) HOUSING COMPRISING OVERPRESSURE PROTECTION

(71) Applicant: Trelleborg Sealing Solutions Germany GmbH, Stuttgart (DE)

(72) Inventor: Jürgen Bauer, Dettenhausen (DE)

(73) Assignee: TRELLEBORG SEALING SOLUTIONS GERMANY GMBH, Stuttgart (DE)

( * ) Notice: Subject to any disclaimer, the term of this patent is extended or adjusted under 35 U.S.C. 154(b) by 150 days.

(21) Appl. No.: 15/804,252

(22) Filed: Nov. 6, 2017

(65) Prior Publication Data
US 2018/0062134 A1 Mar. 1, 2018

Related U.S. Application Data

(63) Continuation of application No. PCT/EP2016/059811, filed on May 3, 2016.

(51) Int. Cl.
| | |
|---|---|
| *H01M 2/12* | (2006.01) |
| *F16K 24/04* | (2006.01) |
| *H01G 11/18* | (2013.01) |
| *H01G 11/78* | (2013.01) |
| *F16K 7/12* | (2006.01) |

(Continued)

(52) U.S. Cl.
CPC ............ *H01M 2/1235* (2013.01); *F16K 7/12* (2013.01); *F16K 17/16* (2013.01); *F16K 17/164* (2013.01); *F16K 24/04* (2013.01); *F16K 31/126* (2013.01); *H01G 11/18* (2013.01); *H01G 11/78* (2013.01);

(Continued)

(58) Field of Classification Search
CPC .... H01M 2/1235; H01M 2/1241; H01M 2/12; H01M 2/1205; H01M 2/1223; H01M 2/1264; H01M 2/1288; H01M 2200/20; F16K 7/12; F16K 17/16; F16K 24/04;
(Continued)

(56) References Cited

U.S. PATENT DOCUMENTS

| | | |
|---|---|---|
| 2,227,319 A | 12/1940 | Pontis et al. |
| 2,766,408 A | 10/1956 | Georgiev et al. |

(Continued)

FOREIGN PATENT DOCUMENTS

| | | |
|---|---|---|
| DE | 10 2012 013 789 A1 | 1/2014 |
| WO | 2014/176533 A1 | 10/2014 |

*Primary Examiner* — Raymond Alejandro
(74) *Attorney, Agent, or Firm* — Hackler Daghighian Martino & Novak

(57) ABSTRACT

A housing having an overpressure protection includes a pressure relief opening with a diaphragm sealing plug to be closed in a fluid-tight manner. The diaphragm sealing plug has a central portion and an angled free peripheral portion. The free peripheral portion in the non-pressurized operating state extends away from the central portion in the direction of the housing external side. The central portion, by way of an increasing housing internal pressure in the axial direction, is deformable in such a manner that the peripheral portion by way of a tension stress that is derived from the deformation of the central portion in a manner proportional to the pressure is releasable from the housing wall in the axial direction in a progressive manner from the inside to the outside such that the diaphragm sealing plug releases the pressure relief opening when a predefined maximum housing internal pressure is reached or exceeded.

12 Claims, 4 Drawing Sheets

(51) Int. Cl.
*F16K 17/164* (2006.01)
*F16K 31/126* (2006.01)
*F16K 17/16* (2006.01)
*H01G 9/12* (2006.01)

(52) U.S. Cl.
CPC ........... *H01G 9/12* (2013.01); *H01M 2200/20* (2013.01); *Y02E 60/13* (2013.01)

(58) Field of Classification Search
CPC ...... F16K 31/126; H01G 11/18; H01G 11/78; H01G 9/12; Y02E 60/13
See application file for complete search history.

(56) References Cited

U.S. PATENT DOCUMENTS

| | | | | |
|---|---|---|---|---|
| 4,728,006 | A * | 3/1988 | Drobish | .................. B65D 1/32 137/849 |
| 7,858,217 | B1 * | 12/2010 | Goda | .................... H01M 2/023 429/53 |
| 2006/0222938 | A1 * | 10/2006 | Yoshioka | ............ H01M 2/0413 429/174 |
| 2013/0273401 | A1 | 10/2013 | Lee et al. | |
| 2015/0194651 | A1 * | 7/2015 | Urano | .................. H01M 2/365 429/53 |

* cited by examiner

HOUSING COMPRISING OVERPRESSURE PROTECTION

CROSS-REFERENCE TO RELATED APPLICATIONS

This continuation application claims priority to PCT/EP2016/059811 filed on May 3, 2016 which has published as WO 2016/177687 A1 and also the German application number 10 2015 208 544.9 filed on May 7, 2015, the entire contents of which are fully incorporated herein with these references.

FIELD OF THE INVENTION

The invention relates to a housing having an overpressure protection. Housings of this type are used in practice in many technical fields in order for the housing or the contents thereof, respectively, to be protected from a damaging overpressure. Safety valves or so-called blowout disks which respond when a maximum permissible housing internal pressure is reached or exceeded and, on account thereof, permit the housing internal pressure to be reduced by exhausting a fluid that is disposed in the housing into the environment are often employed herein. Safety valves typically close in a self-acting manner when the housing internal pressure is reduced, such that the housing can optionally be continued to be used without any further measures being taken. By contrast, blowout disks are destroyed by responding to an impermissible housing internal pressure in the manner of a predetermined breaking point and must be replaced in order for the housing to continue to be used.

BACKGROUND OF THE INVENTION

Safety valves as well as blowout disks are complex in terms of the production or assembly, respectively, thereof, and therefore represent a cost factor that cannot be ignored. Sealing plugs from a material that is deformable in a rubber-elastic manner and which are disposed in the radial press-fit in the pressure relief opening have to date not been a suitable replacement for the above-mentioned blowout disks or safety valves because the response characteristic of said sealing plugs, in particular in the case of a low maximum permissible housing internal pressure, has to date not been sufficiently reliable.

It is therefore the object of the invention to specify a housing having an overpressure protection having a pressure relief opening and a diaphragm sealing plug, which can be made in a simple and cost-effective manner and in which the diaphragm sealing plug even at low housing internal pressures has a reliable response characteristic such that the housing can be employed even in the case of critical applications, for example as a battery housing for lithium batteries or the like.

This object is achieved by a housing having the features stated in the independent patent claim. Advantageous refinements of the invention are stated in the description and in the dependent claims.

SUMMARY OF THE INVENTION

The housing according to the invention has an overpressure protection having a pressure relief opening which extends from the housing interior, or an internal side of the housing, respectively, to the housing external side. In the pressure relief opening, a diaphragm sealing plug from a material that is deformable in a rubber-elastic manner is disposed in the seal seat, said diaphragm sealing plug closing the pressure relief opening in a fluid-tight manner. The diaphragm sealing plug has a central portion and an angled peripheral portion which in the non-pressurized operating state of the diaphragm sealing plug extends away from the central portion in the direction of the housing external side. The peripheral portion in the non-pressurized state in relation to the central portion thus encloses an angle of $\leq 180°$, preferably of approximately 90°.

The diaphragm sealing plug by way of the peripheral portion in a direction that is radial to the central axis of the diaphragm sealing plug bears in a fully circumferential and sealing manner on a housing wall that delimits the pressure relief opening. In other words, the diaphragm sealing plug is configured as a radial sealing element.

The central portion of the diaphragm sealing plug, by way of an increasing housing internal pressure (Pi) in the axial direction, is deformable in such a manner that the peripheral portion by way of a tension stress Z that is derived from the deformation of the central portion is releasable in a manner proportional to the pressure from the housing wall in the axial direction, in a progressive manner from the inside to the outside, until the diaphragm sealing plug releases the pressure relief opening when a predefined housing internal pressure Pi is reached or exceeded.

On account of the deformation, for example of a telescopic protuberance of the central portion by way of the free peripheral portion that (still) bears on the housing wall, a tension stress, on account of which the peripheral portion, in a manner proportional to the pressure, is successively peeled from the housing wall, is exerted on the free peripheral portion. The tension stress has one component that is directed radially and one component that is directed axially (in relation to the housing external side). For relieving the pressure of the housing interior, a frictional engagement that exists between the peripheral portion and the housing wall can be overcome in a reliable manner on account of the tension stress, and the peripheral portion by way of the central portion can be moved out of the pressure relief opening. Overall, a sensitive and precise response characteristic of the overpressure protection that has not been achieved to date can be implemented on account thereof. Depending on the choice of material and of the material thickness of the diaphragm sealing plug employed, a reliable pressure relief of the housing interior can be guaranteed even at a maximum housing internal pressure which marginally exceeds the atmospheric ambient pressure (by a few tenths or a few hundredths of a bar). The diaphragm sealing plug that is deformable in a rubber-elastic manner herein can be made and assembled on the housing in a simplified and cost-effective manner as compared to safety valves or blowout disks, respectively. It is understood that the diaphragm sealing plug, following the one-off response to a housing overpressure, must be re-inserted into the sealing position thereof in the pressure relief opening, or be replaced in a manner corresponding to that of blowout disks, respectively.

Particularly reliable sealing of the housing interior in relation to the environment is achieved according to the invention in that a radial contact compression of the peripheral portion against the housing wall in the non-pressurized state of the diaphragm sealing plug that is disposed in the seal seat increases axially in the direction of the housing interior. The contact compression, or the contact compression profile, respectively, in this case has a maximum in the axial direction close to the housing interior.

For a particularly sensitive and reliable response characteristic of the diaphragm sealing plug, the peripheral portion of the diaphragm characteristic plug in the non-pressurized state of the diaphragm sealing plug extends in the axial direction up to the housing external side, or substantially up to the housing external side. Alternatively, the free peripheral portion in the non-pressurized state can also project beyond the housing external side. On account thereof, with the supporting action of the elastic restoring urge of the diaphragm sealing plug, the free peripheral portion of the diaphragm sealing plug, by way of a housing edge across which the housing wall and the housing external side meet, can, in a simplified manner, be completely moved, or levered, respectively, out of the pressure relief opening in the axial direction when the predefined maximum housing internal pressure is reached.

According to the invention, the diaphragm sealing plug is inserted or disposed, respectively, so as to be loose in the pressure relief opening.

The central portion of the diaphragm sealing plug in the non-pressurized state has a (central) concavity (=depression) which is disposed on the central axis and in the axial direction points to the external side of the housing. A defined deformation of the central portion in the case of an impingement of the diaphragm sealing plug with pressure can be guaranteed on account thereof, the peripheral portion in the circumferential direction by way of said deformation being lifted or peeled, respectively, in the radial direction from the sealing face that is formed by the housing wall.

According to a particularly preferred refinement of the invention, the central portion of the diaphragm sealing plug in the cross section is configured in a zigzag-shaped manner. The central portion of the diaphragm sealing plug can have a W-shaped or else a double-W-shaped cross section, for example. The aforementioned central concavity of the central portion can be implemented on account thereof, on the one hand. Moreover, a stiffening of the diaphragm sealing plug in the radial direction that is required for the sealing function of the diaphragm sealing element can be enabled on account thereof. A desired contact compression of the peripheral portion against the housing wall can be set in a simplified manner on account thereof.

The diaphragm sealing plug according to the invention is preferably configured so as to be integral. On account thereof, the diaphragm sealing plug can be produced in a cost-effective manner and with very minor production tolerances so as to guarantee a sealing bearing on the housing wall of the housing that is an exact fit and in the circumferential direction is uniform.

It is understood that the diaphragm sealing plug by virtue of the radial oversize thereof in relation to the pressure relief opening that is required for the sealing capability of said diaphragm sealing plug upon installation of the latter into the pressure relief opening at first is subject to a certain residual deformation under pressure. This is a behavior that is inherent to the elastomers and must be taken into account in a corresponding manner in the selection of materials and the dimension of the diaphragm sealing plug.

The diaphragm sealing plug preferably has a uniform thickness or a substantially uniform thickness. In the latter case, the thickness of the diaphragm sealing plug preferably varies at maximum by 30% of the nominal thickness (=mean thickness) of the diaphragm sealing plug.

Considering aspects of production technology, the diaphragm sealing plug is preferably configured so as to be rotationally symmetrical in relation to the central axis.

The assembly of the housing or of the diaphragm sealing plug, respectively, can on account thereof be even further facilitated in that the housing wall which delimits the pressure relief opening forms an axial detent for the diaphragm sealing plug. On account thereof, a desired introduction depth of the diaphragm sealing plug into the pressure relief opening can be predefined in a simple manner in terms of construction. This is of advantage in particular with a view to the interaction between the peripheral portion and the housing edge that has been explained above.

BRIEF DESCRIPTION OF THE DRAWINGS

The invention will be explained in more detail hereunder by means of an exemplary embodiment that is reflected in the drawing. In the drawing.

DETAILED DESCRIPTION OF THE PREFERRED EMBODIMENTS

Figure 1:
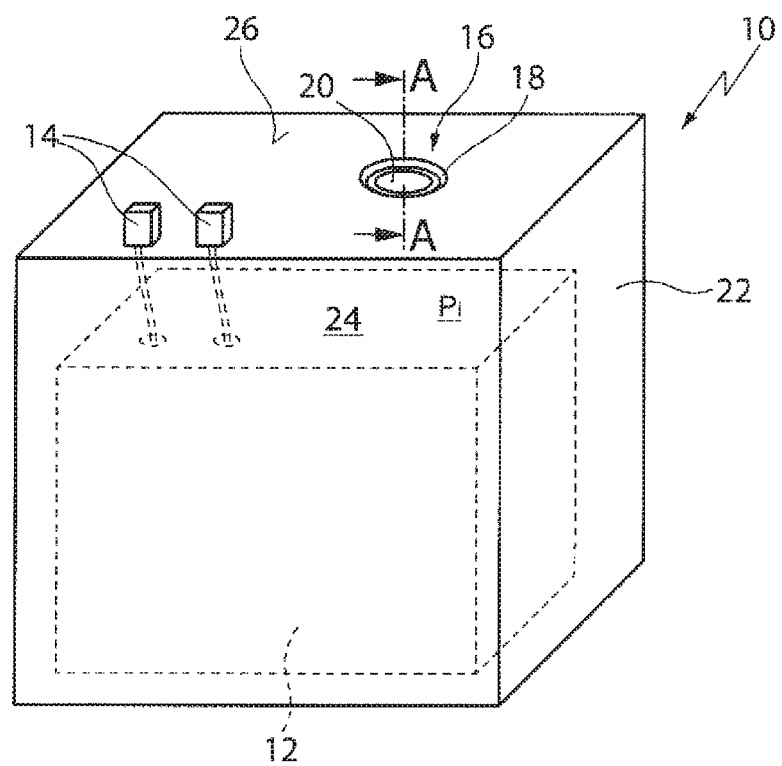
FIG. 1 shows a housing for an energy accumulator, having an overpressure protection having a pressure relief opening which by means of a diaphragm sealing plug that is inserted into the pressure relief opening is closed in a fluid-tight manner, in perspective view.

FIG. 1 shows a housing 10 for a lithium-ion accumulator 12, consequently a so-called battery housing. It is understood that the housing 10 can also be employed in the case of other technical applications.

The housing 10 has two terminals 14 for connecting the lithium-ion accumulator 12 to an electrical consumer (not reflected in the drawing), for example to the on-board circuit of a motor vehicle. The housing 10 is provided with a single-use overpressure protection 16 having a pressure relief opening 18 and having a diaphragm sealing plug 20 that is disposed in the seal seat in the pressure relief opening 18. The diaphragm sealing plug 20 closes the pressure relief opening 18 in a fluid-tight manner.

The pressure relief opening 18 engages through the housing wall 22 of the housing and extends from the housing interior 24 to the housing external side 26. The diaphragm sealing plug 20 is conceived in such a manner that the latter when reaching a predefined maximum housing internal pressure Pi releases the pressure relief opening 18, that is to say in fluidic terms interconnects the housing interior 24 and the housing external side 26, or an atmosphere that surrounds the housing 10, respectively.

The diaphragm sealing plug 20 is composed of an elastomer, that is to say of a material that is deformable in a rubber-elastic manner.

Figure 2:
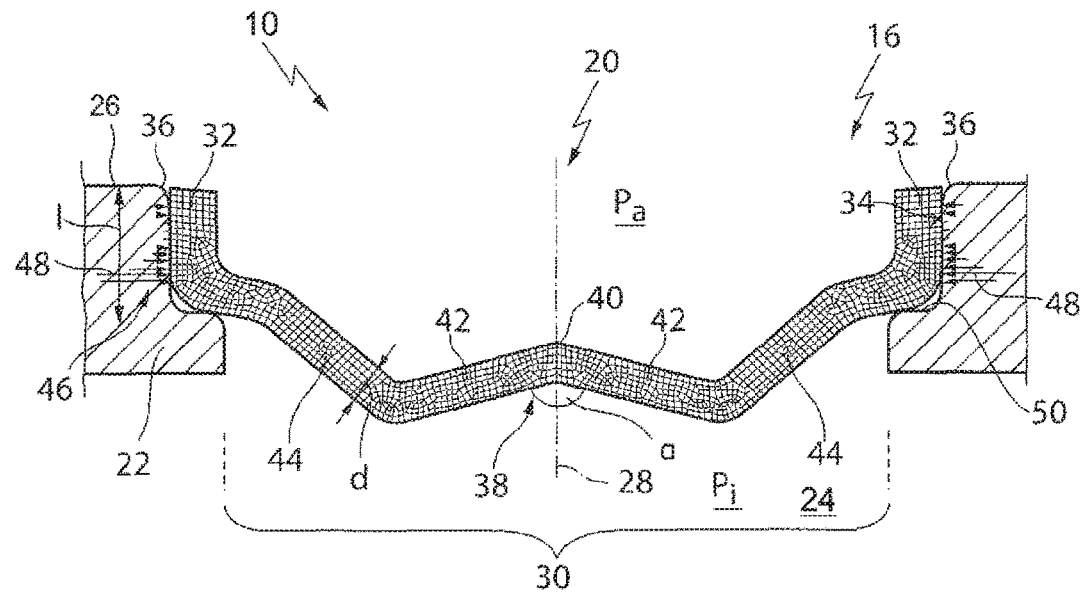
FIG. 2 shows the housing from FIG. 1 in the non-pressurized state of the overpressure protection, in a fragmented sectional illustration along the section plane referred to as A-A in FIG. 1.

In FIG. 2 the housing is reflected in a fragmented manner in a section along the section plane referred to as A-A in FIG. 1. The housing 10 or the diaphragm sealing plug 20, respectively, are shown in the non-pressurized operating state. The housing internal pressure Pi consequently corresponds to an atmospheric ambient pressure Pa.

The diaphragm sealing plug 20 is presently embodied so as to be integral and in relation to the central axis 28 thereof is configured so as to be rotationally symmetrical. The diaphragm sealing plug has a central portion referred to as 30 and an angled free peripheral portion 32. The central portion 30 covers the pressure relief opening 18. As can be derived from FIG. 2, the peripheral portion 32 in the non-pressurized operating state extends from the central portion 30 outward in the axial direction, that is to say from the central portion 30 of the diaphragm sealing plug 20 away in the direction of the housing external side 26.

The diaphragm sealing plug 20 by way of the free peripheral portion 32 thereof in a direction that is radial to the central axis 28 of the diaphragm sealing plug 20 bears in a fully circumferential and sealing manner on a housing wall 34 that delimits the pressure relief opening 18. The free peripheral portion 32 thus has the function of a lip seal. It is to be noted that the free peripheral portion 32 of the diaphragm sealing plug 20 in the non-pressurized operating state bears in a sealing manner on the housing wall 34 not in a linear manner but by way of a major part of the longitudinal extent l of said peripheral portion 32.

The diaphragm sealing plug 20 overall can have a uniform thickness d. The free peripheral portion 32 in the exemplary embodiment shown has a somewhat greater thickness d than the central portion 30. A thickness differential of the two portions is preferably 30% maximum.

The free peripheral portion 32 of the diaphragm sealing plug 20 in the non-pressurized state extends in the axial direction at least up to a housing edge 36, or substantially to the housing edge 36, by way of which the housing wall 34 that laterally delimits the pressure relief opening 18 and the housing external side 26 of the housing 10 meet. As is shown in FIG. 2, the housing edge 36 can be embodied so as to be rounded. The free peripheral portion 32 of the diaphragm sealing plug 20 can also extend in the axial direction beyond the housing external side 26 of the housing 10.

The diaphragm sealing plug 20 in the non-pressurized state has a substantially C-shaped cross section. The central portion 30 of the diaphragm sealing plug 20 herein for a sufficient sealing capacity and for a uniform contact compression of the peripheral portion 32 against the housing wall 34 has a zigzag-shaped cross section, or here an overall W-shaped cross section, respectively. The central portion 30, on account thereof, has a central concavity 38 which is disposed on the central axis 28 of the diaphragm sealing plug 20 and points or projects, respectively, toward the housing external side 26. An apex 40 of the concavity in the axial direction is disposed between the two peripheral portions 32 of the diaphragm sealing plug 20. The concavity 38 of the central portion 30 is formed by two central legs 42 which conjointly enclose an obtuse angle α that is open toward the housing interior. The two central legs 40 are in each case connected to the free peripheral portion 32 by way of one angled peripheral (radially outward) leg 44.

A contact compression profile 46 of the peripheral portion 32 of the diaphragm sealing plug 20 that bears on the housing wall 34 in a biased and sealing manner is highlighted by arrows in FIG. 2. A maximum 48 of the contact compression in the axial direction is disposed close to the housing interior. The contact compression decreases in the direction of the housing external side 26.

A step-type axial detent 50 of the housing wall for the diaphragm sealing plug 20 defines a maximum installation depth of the diaphragm sealing plug 20 in the pressure relief opening 18.

In the case of an increase in housing internal pressure Pi, that is to say in the case of an impingement of the internal side of the diaphragm sealing plug 20 with pressure, the central portion 30 of the diaphragm sealing plug 20 is pressed axially in the direction toward the housing external side 26, that is to say in the axial direction is deformed in an elastic outward manner in relation to the peripheral portion 32 of the diaphragm sealing plug 20. The peripheral portion 32 herein, by virtue of the inherent elasticity of the material of the diaphragm sealing plug 20, is impinged with a tension stress that is directed radially inward, and in the axial direction is progressively released or peeled, respectively, from the housing wall (in the radial direction) from the inside to the outside until the diaphragm sealing plug 20, when reaching or exceeding a defined maximum housing internal pressure Pi, has been completely removed from the seal seat thereof within the pressure relief opening 18 and releases the pressure relief opening. At this point in time, the housing interior 24 in fluidic terms is connected to the housing external side 26, or to the atmosphere that surrounds the housing 10, respectively, and consequently a pressure equalization, or a pressure relief of the housing interior, respectively, is enabled. This pressure relief process will be explained in more detail hereunder by means of the illustrations in FIGS. 3 to 5.

Figure 3:
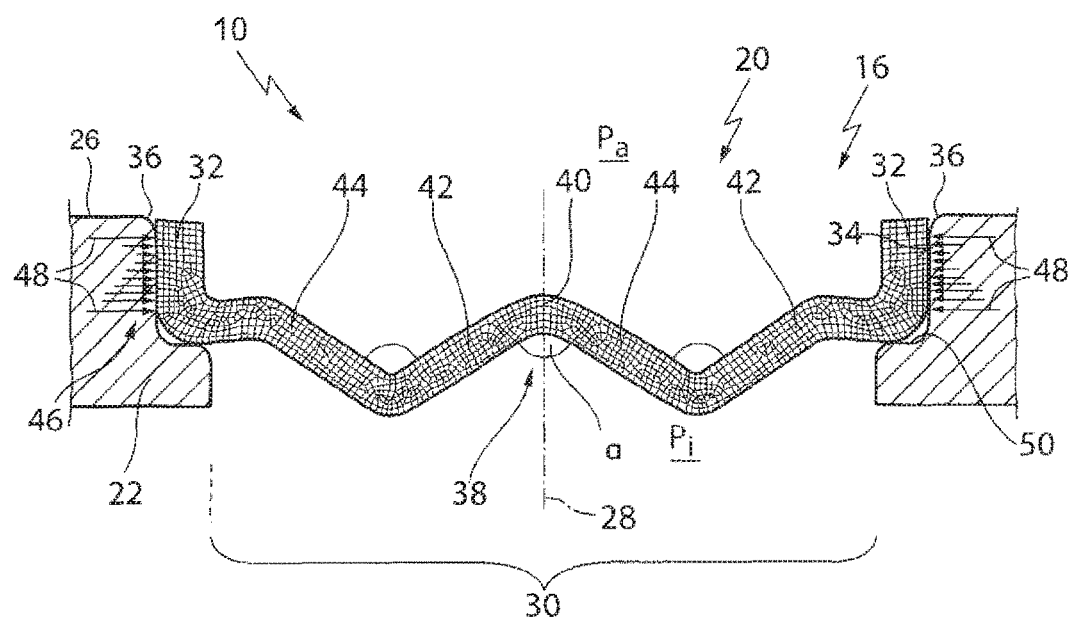
FIG. 3 shows the housing from FIG. 1 in the case of an increased housing internal pressure, in a fragmented sectional illustration.

In FIG. 3 the housing 10 in an exemplary manner is shown having a housing internal pressure Pi with Pi=1.2 bar, that is to say at an internal impingement of the diaphragm sealing plug 20 with pressure at a differential pressure of 200 mbar in relation to the ambient pressure Pa. The deformation of the central portion 30 of the diaphragm sealing plug 20 in the direction of the housing external side 26 can be readily seen, said deformation being mirror symmetrical to the central axis 28 and directed in an axial manner.

The contact compression profile of the free peripheral portion that bears in a sealing manner on the housing wall shows two maxima 48 which in the axial direction are mutually spaced apart. The pressure equalization opening 18 is furthermore closed in a fluid-tight manner by the diaphragm sealing plug 20.

Figure 4:
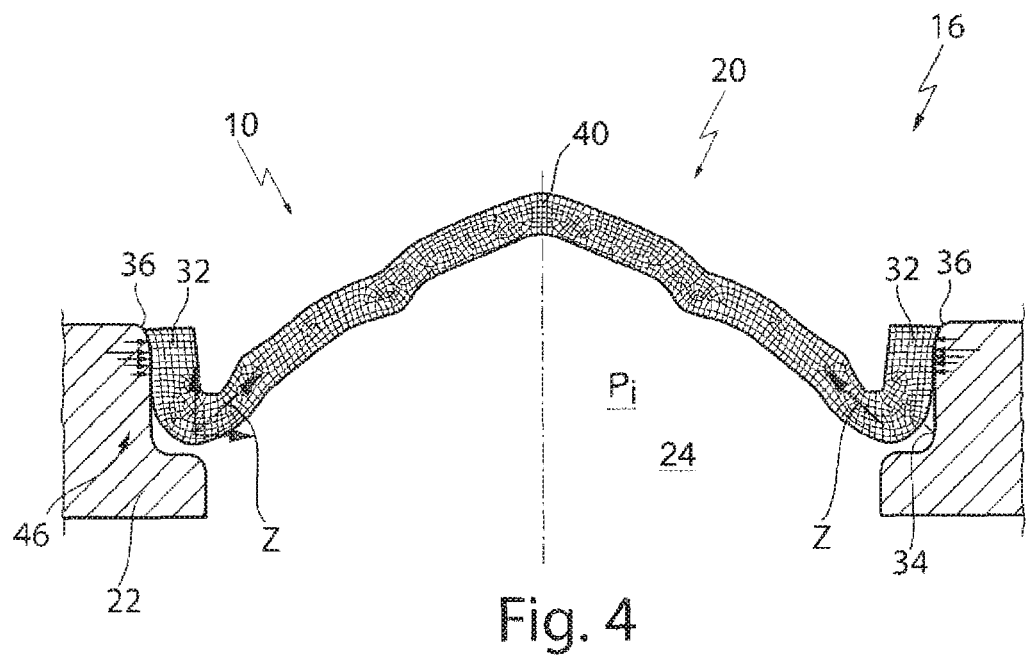
FIG. 4 shows the housing from FIG. 1 in the case of a housing internal pressure that is higher in relation to the illustration in FIG. 3, in a fragmented sectional illustration.

FIG. 4 shows the housing 10 in the region of the overpressure protection 16 at a housing internal pressure Pi with Pi=1.220 bar that is higher in comparison to FIG. 3, that is to say at an impingement of the diaphragm sealing plug 20 with pressure at a differential pressure of 220 mbar. The central portion 30 of the diaphragm sealing plug 20 by way of the apex 40 thereof in the axial direction is outwardly deformed in a manner running through the peripheral portion 32. A tension stress of the central portion that engages on the peripheral portion 32 is referred to by the arrow Z. Force components of the tension stress that act in an axial and radial manner are highlighted by arrows (not referred to in more detail). The zigzag-shaped cross section, shown in FIG. 1, of the non-pressurized diaphragm sealing plug 20 is substantially cancelled (elapsed).

The free peripheral portion 32 has a contact compression profile having only one maximum 48 which, as opposed to the non-pressurized operating state according to FIG. 1, is no longer disposed in the region of the free end of the peripheral portion 32.

The free peripheral portion 32 is largely removed or lifted, respectively from the housing wall 34.

Figure 5:
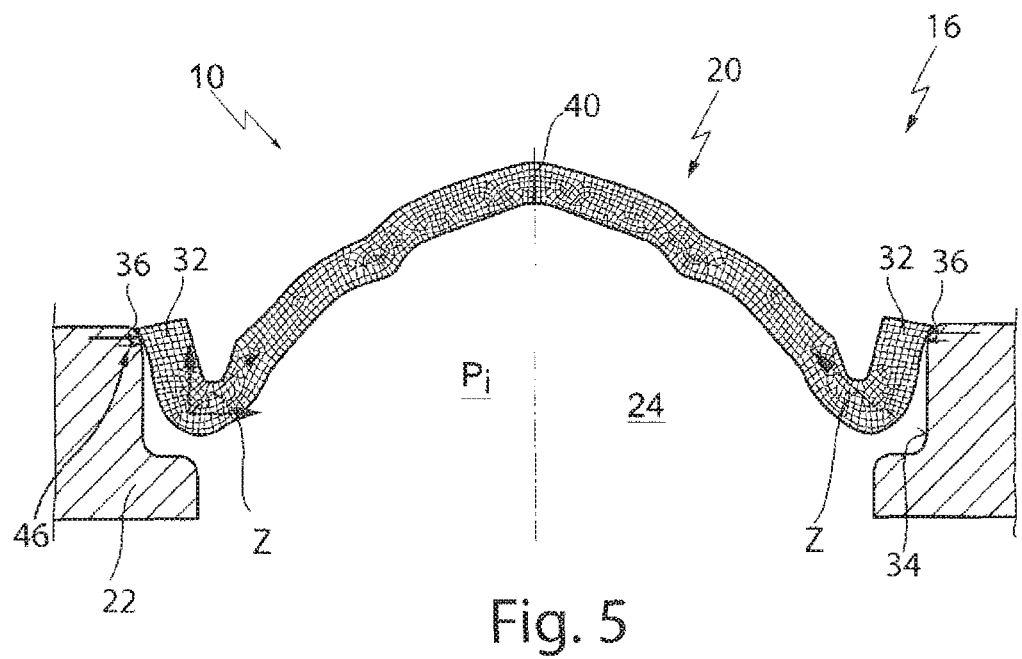
FIG. 5 shows the housing from FIG. 1 in the case of an housing internal pressure that is yet again higher in relation to the illustration in FIG. 4, in a fragmented sectional illustration.

In FIG. 5 the housing internal pressure Pi of the housing in an exemplary manner is 1.222 bar. As opposed to the operating state reflected in FIG. 4, the diaphragm sealing plug 20 is thus impinged with a yet higher differential pressure of presently 222 mbar. The free peripheral portion 32 has almost entirely peeled from the housing wall 34 and bears on the housing wall 34 in a linear manner, or in a substantially linear manner, respectively, only in the region of the housing edge 36. The central portion 30 by way of the free peripheral portion 32 protrudes outward in the manner of a telescope.

Figure 6:
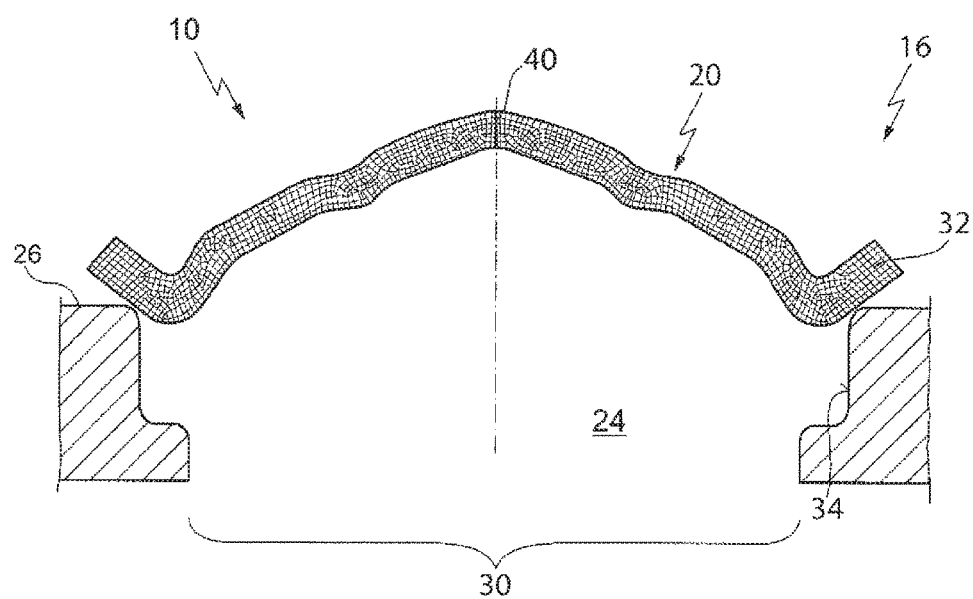
FIG. 6 shows the housing from FIG. 1 at the point in time of pressure relief when reaching a predefined maximum housing internal pressure, at which point the diaphragm sealing plug releases the pressure relief opening, in a fragmented cross section.

In FIG. 6 the housing is shown at the point in time of reaching a predefined maximum housing internal pressure Pi, that is to say when reaching the opening pressure of the diaphragm sealing plug 20. The diaphragm sealing plug 20 in the axial direction has been moved from the seal seat thereof, or from the installed position thereof, respectively, out of the pressure relief opening 18, releasing the latter. On account thereof, a pressure equalization between the housing interior 24 and the housing external side, or of an atmosphere that surrounds the housing 10, respectively, is enabled. The diaphragm sealing plug 20, by virtue of the free peripheral portion 32 that in the axial direction has been moved (levered) across the housing edge 36, can relax in the radial direction.

The free peripheral portion of the diaphragm sealing plug 20, by virtue of the constructive design embodiment of the diaphragm sealing ring 20, by way of an increasing impingement of the diaphragm sealing plug 20 with pressure in the axial direction can thus be progressively released from the housing wall 34 from the inside to the outside in a manner proportional to the pressure, and the diaphragm sealing plug 20, on account thereof, be moved from the seal seat thereof when a defined maximum housing internal pressure Pi is reached or exceeded, without friction forces that exist between the diaphragm sealing plug 20 and the housing wall 34 to this end having to be overcome by a purely axial movement of the peripheral portion (static friction). On account thereof, for the first time a maximum housing internal pressure Pi in the housing 10 can be reliably maintained when a rubber-elastic plug is used.

What is claimed is:

1. A housing having an overpressure protection, comprising:
    a pressure relief opening which extends from the housing interior to the housing external side;
    a diaphragm sealing plug, from a rubber-elastic material, which is disposed in the pressure relief opening in the seal seat in order for the latter to be closed in a fluid-tight manner, wherein the diaphragm sealing plug is disposed so as to be loose in the pressure relief opening, and the diaphragm sealing plug has a central portion and an angled free peripheral portion by way of which the diaphragm sealing plug in a direction that is radial to the central axis of the diaphragm sealing plug bears in a fully circumferential and sealing manner on a housing wall that delimits the pressure relief opening, wherein the free peripheral portion in the non-pressurized operating state of the diaphragm sealing plug extends away from the central portion in the direction of the housing external side and in the axial direction extends up to the housing external side or projects beyond the housing external side, wherein a radial contact compression of the free peripheral portion of the diaphragm sealing plug against the housing wall in the non-pressurized operating state of the diaphragm sealing plug is reduced axially in the direction of the housing external side;
    wherein the central portion in the non-pressurized state in the cross section is configured so as to be W-shaped and has a central concavity having an apex, said central concavity being disposed on the central axis and in the axial direction pointing toward the external side of the housing, said apex being disposed in the axial direction between the two peripheral portions of the diaphragm sealing plug, wherein the concavity of the central portion is formed by two central legs which conjointly enclose an obtuse angle α that is open toward the housing interior; and
    wherein the central portion by way of an increasing housing internal pressure in the axial direction is deformable in such a manner that the peripheral portion by way of a tension stress that is derived from the deformation of the central portion is releasable in a manner proportional to the pressure from the housing wall in the axial direction, in a progressive manner from the inside to the outside, until the diaphragm sealing plug releases the pressure relief opening when a predefined maximum housing internal pressure is reached or exceeded.

2. The housing as claimed in claim 1, wherein the diaphragm sealing plug is configured so as to be integral.

3. The housing as claimed in claim 2, wherein the diaphragm sealing plug has a uniform thickness or a substantially uniform thickness.

4. The housing as claimed in claim 3, wherein the diaphragm sealing plug is configured so as to be rotationally symmetrical in relation to the central axis thereof.

5. The housing as claimed in claim 4, wherein the diaphragm sealing plug is disposed in the pressure relief opening so as to be held solely in a frictionally engaged manner.

6. The housing as claimed in claim 5, including an axial detent for the diaphragm sealing stopper.

7. The housing as claimed in claim 6, wherein the housing is a battery housing.

8. The housing as claimed in claim 1, wherein the diaphragm sealing plug has a uniform thickness or a substantially uniform thickness.

9. The housing as claimed in claim 1, wherein the diaphragm sealing plug is configured so as to be rotationally symmetrical in relation to the central axis thereof.

10. The housing as claimed in claim 1, wherein the diaphragm sealing plug is disposed in the pressure relief opening so as to be held solely in a frictionally engaged manner.

11. The housing as claimed in claim 1, including an axial detent for the diaphragm sealing stopper.

12. The housing as claimed in claim 1, wherein the housing is a battery housing.

* * * * *